Oct. 16, 1934.  F. R. HOUSE  1,976,726
MEANS FOR INDICATING RATE AND DIRECTION OF MOVEMENT
Filed June 21, 1929  2 Sheets-Sheet 1
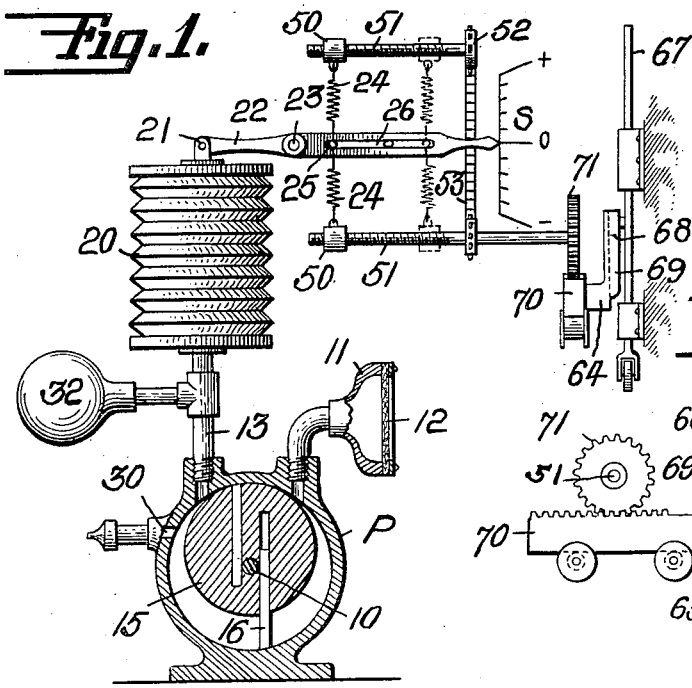
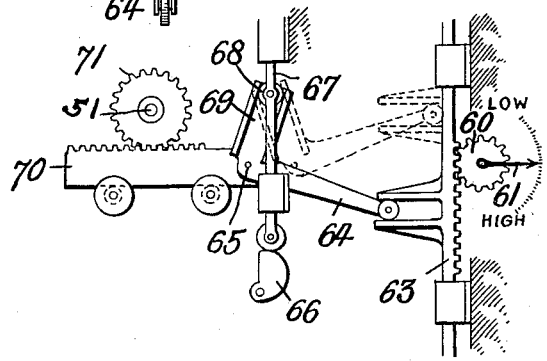
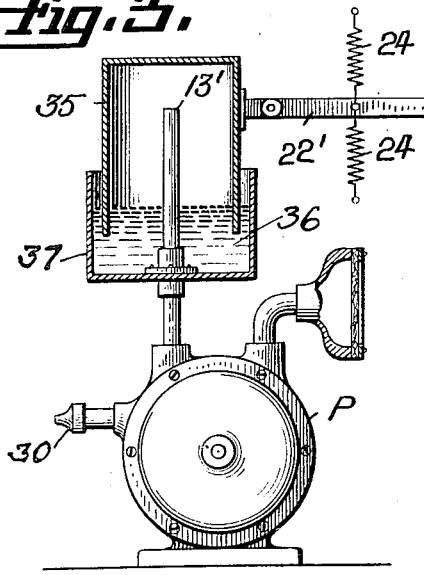
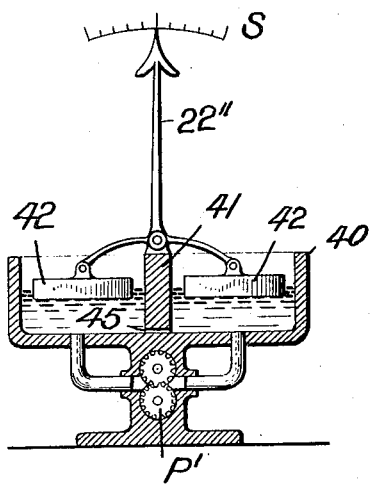
INVENTOR
FRANK R. HOUSE
BY
Herbert H. Thompson
his ATTORNEY.

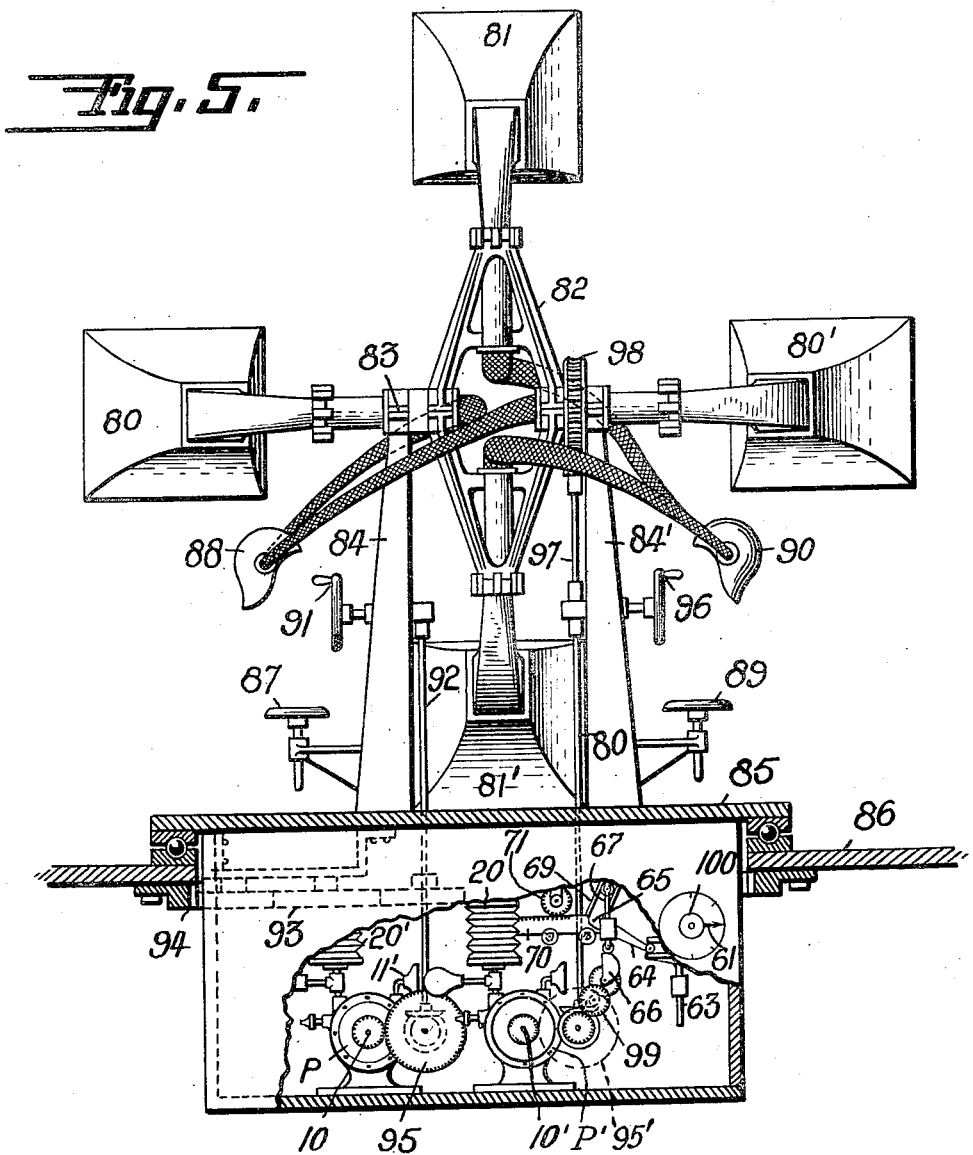

Patented Oct. 16, 1934

1,976,726

UNITED STATES PATENT OFFICE

1,976,726

MEANS FOR INDICATING RATE AND DIRECTION OF MOVEMENT

Frank R. House, Baldwin Harbor, N. Y., assignor to Sperry Gyroscope Company, Inc., Brooklyn, N. Y., a corporation of New York Application June 21, 1929, Serial No. 372,777

13 Claims. (Cl. 235—61)

This invention relates to means for indicating direction and rate of movement, particularly angular rate of travel of a rotatable target bearing instrument, such as a sound locator or sight. It is one of the objects of the invention to provide a rate indicating means which shall be uninfluenced by variations in rate that are of short duration, and which will average such variations to give a steady indication for use in computing data for fire control purposes.

It is a further object of my invention to provide a means for indicating distance travel, that is to say, of rate of movement multiplied by time.

My invention is capable of application to a plurality of uses, but is especially desirable for use in following a target, such as an aircraft, by a sound locator, range-finder, or other means.

Further objects and advantages of this invention will become apparent in the following detailed description.

In the accompanying drawings:

Fig. 1 is an assembly view, partly sectioned vertically, disclosing one embodiment of my invention.

Fig. 2 is an elevation embodying an enlarged view of the details of the time element.

Fig. 3 is a front elevation, partly sectioned vertically, of a modified form of fluid pressure responsive device which may be substituted for that of Fig. 1.

Fig. 4 is a front vertical section through still another form of fluid pressure responsive device.

Fig. 5 is a rear elevation of a binaural sound locator showing how my invention is applied thereto.

Referring to Fig. 1 of the drawings, I have disclosed means adapted to be operated in accordance with the rate of movement of an object. As stated hereinbefore, this object may be a target whose movements are being followed by some detector means, such as a sound locator. The movements of the sound locator in azimuth are adapted to operate a shaft 10 of a pump P which may be of any suitable design or type, but which is shown as a vane type pressure suction pump. Such a pump is adapted to draw air in through an inlet 11 which may be provided with a felt filter 12 and expel the air through an outlet 13. The vane-carrying member 15 fixed to the shaft 10 is eccentrically positioned and carries the sliding vanes 16 in a well known manner. It is a characteristic of a fluid pressure pump of this type that when the rotating member 15 rotates in one direction the device operates as a force pump, and when the said member rotates in the other direction it operates as a suction pump. It is a further characteristic of this pump that the amount of positive or negative pressure generated or developed is a function of the speed of rotation of member 15. It will thus be seen that by utilizing this fluid pressure or suction device I generate pressure or develop suction to give an indication of direction of rotation of shaft 10, as well as the rate of rotation thereof, and hence generate pressure or suction in accordance with the direction and rate of movement of the object whose movement is being measured.

For giving an indication of the rate and direction of movement I may cause the said pump P to be connected via pipe 13 to an air container 20, which in Fig. 1 takes the form of an expansible bellows, the opposite end of which is pivotally connected at 21 to an opposing or counter-acting force which may take the form of a lever 22 pivoted at 23 and having connected thereto on the opposite side of said pivot to the point of connection 21 tenson members 24 connected to a pin 25 slidable in a slot 26 in said lever 22, said pin and slot connection being designed for a purpose to be described more fully hereinafter.

It will now be seen that as fluid under pressure is delivered to the bellows, or as fluid is withdrawn therefrom, the lever 22 will be rocked about pivot 23 in one direction or the other against the action of one or the other of the springs to give an indication upon a scale S of the rate of movement of the object. The scale S may, therefore, be calibrated, if desired, in any unit of speed, such as degrees of azimuth per second.

It will be understood that a certain amount of leakage occurs past the vanes 16 and I provide for further leakage in the form of a leak 30 adjacent the outlet 13 whereby the air pressure supplied by the pump will cause a certain amount of air to pass through leak 30 in one direction or the other in accordance with the velocity and direction of rotation of the pump. When the counteracting pressure of springs 24 upon the bellows reaches a point such that sufficient pressure will be exerted upon the bellows to cause the same amount of fluid to pass through leak 30 and to leak past the vane 16 as the pump supplies or withdraws, then the indication will be constant.

To provide against rapid fluctuations of the indicating means due to variations in rate of movement of shaft 10 for short periods, I provide a bellows 20 of relatively large content so that the amount of air delivered thereto per rotation of the member 15 is relatively small and will have little effect upon the indicating means. It will thus be seen, therefore, that at least several rotations of member 15 are necessary before any appreciable variation of the indication is obtained. Minor fluctuations are thus ironed out or averted. To further augment the volumetric capacity of the bellows 20 I may provide an air chamber 32 adjacent to and in connection with the said bellows.

A modified form of pressure responsive means is disclosed in Fig. 3. The same pump P is shown but the bellows has been displaced by another pressure responsive device which may be found more suitable in cases where the bellows is found too inflexible and the fluid supplied by the pump, which is usually air, is found to have too small an effect upon such bellows. For this reason the fluid delivered by pump P may be discharged through an outlet 13' in the form of a pipe extending upwardly into an inverted bell 35 whose open end extends beneath the surface of mercury 36 in a container 37. The fluid thus discharged through pipe 13' will cause the bell 35 to rise or fall and operate a lever 22' against the action of opposing means 24 as before.

In Fig. 4 I have disclosed still another form of fluid pressure responsive device. In this form I employ preferably a gear pump P' to suck fluid out of one side and pump the same into the other side of a container 40 having a partition 41 to form the two sides of the container. Floats 42 rest upon the liquid within container 40 and the relative movement of the floats, as the liquid rises and falls in the respective sides of the container, will operate a pointer 22'' in the same manner as heretofore described. A leak 45, which in principle operates like the leak 30, is provided.

The device hereinbefore described for giving an indication of rate of movement is applicable also for indicating amount of movement when such rate is multiplied by time. I prefer to do this mechanically by introducing the time factor in the following manner. As hereinbefore described, the springs 24 are connected to a pin 25 which is slidable within slide 26 in the lever 22. It will be apparent that as said pin is moved in said slide in one direction or the other that the point of application of the tension members is varied and that the amount of opposition offered likewise varies. Thus, if the distance from pivot 23 to pin 25 is a given quantity, if said distance is cut in half the amount of opposition offered by the tension members is likewise cut in half and the indication is doubled. Therefore, for a greater time factor the pin 25 is moved closer to pivot 23 and as the time decreases the pin 25 is moved away from pivot 23.

For accomplishing the said movement of pin 25 in accordance with the time, I may cause the outer ends of tension members 24 to be fixed to blocks 50 threaded upon screws 51, which may be simultaneously driven in any suitable manner, as by sprocket wheels 52 fixed to said screws 51 and a sprocket chain 53 passing over said sprocket wheels.

In Figs. 2 and 5 I have shown a specific application of the invention to means for introducing the time element in the operation of locating an aircraft by a sound locator. The sound locator shown in Fig. 5 is of the conventional binaural type having pairs of horns 80—80' and 81—81' spaced laterally and vertically, respectively. The horns are mounted on a common frame 82 journalled for rotation about a horizontal axis 83 in standards 84—84'. The entire device is mounted on a platform 85 which in turn is mounted for rotation about a vertical axis 86 in the support 86. The horns, therefore, may be revolved as a unit either in elevation or in azimuth. It is usual to provide a separate listener for each pair of horns, the azimuth observer sitting on stool 87 and wearing helmet 88 connected to the horns 80 and 80', while the elevation observer sits on stool 89 and wears helmet 90 connected to horns 81 and 81'. The former rotates the device in azimuth by a handwheel 91 geared to vertical shaft 92. This shaft not only turns the platform through suitable gearing 93 meshing with the internal gear 94 thereon but also drives the shaft 10 of the pump P through suitable step-up gearing 95. Similarly the elevation handwheel 96 drives the shaft 97 which turns the horns in elevation through wormwheel 98 on frame 82. Shaft 80 also turns a sine cam 66 through suitable gearing 99 for the purpose hereinafter described. In addition, shaft 97 drives the shaft 10 of the pump P through gearing 95', this pump being the elevation pump corresponding to the azimuth pump P.

It will be readily understood that when a sound of the aircraft is received by the locator that a certain time lag has intervened, which in seconds equals the slant range from the locator to the aircraft divided by the velocity of sound (1090 feet per second). The slant range is a function of the altitude of the aircraft or target being equal to the altitude divided by the sine of the angle of elevation. In Fig. 2, I have shown how the time is introduced as calculated upon the basis of these factors. The altitude is estimated by means of any suitable height or range finder and may be introduced by means of a pinion 60, the degree of whose movement may be indicated by an indicator 61 operating over a scale calibrated in terms of altitude and set in accordance with the known altitude from a knob 100. The said pinion 60 may operate a rack 63 to rock a bell crank 64 about its pivot 65 on a slide 70. The linear movement of the slide is determined by means of a sine cam 66 which is operated according to the angle of elevation to operate a member 67 including a roller 68 engaging in a groove 69 formed on the other end of bell crank 64. It will thus be seen that the two adjustments for altitude and for angle of elevation will determine the amount of linear movement of the slide 70 representing the slant range of which the time of flight of the shell is a function. Said slide may be caused to drive the screws 51 in any suitable manner, as through a pinion 71 fixed to the shaft of one of the sprocket wheels. The point of application of pin 25 is thus changed in accordance with the time factor and with the pump shaft 10 driven from the sound locator the scale S will now indicate the total movement for a given time i. e., the azimuth deviation angle due to sound lag. Thus, an additional scale may be provided on scale S calibrated in terms of, for instance, degrees in azimuth or elevation showing the sound lag error angle.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A sound lag error computing means including a sound locator, means for developing positive and negative fluid pressures according to the direction of movement of the sound locator, means whereby said first means is actuated in accordance with the movements of said sound locator, and means responsive to the pressure developed, said last-named means including an expansible means of large capacity relative to the rate of pressure development by said first means, and yielding means for opposing the movements of said expansible means in accordance with the slant range.

2. A sound lag error computing means including a sound locator, means for developing positive and negative fluid pressures according to the direction of movement of the sound locator, means whereby said first means is actuated in accordance with the movements of said sound locator, and means responsive to the pressure developed, said last-named means including an expansible means, yielding means for opposing the movements of said expansible means, and means for varying the application of said opposing means in accordance with the slant range.

3. A sound lag error computing means including a sound locator, means for developing positive and negative fluid pressures according to the direction of movement of the sound locator, means whereby said first means is actuated in accordance with the movements of said sound locator, means permitting leakage of said fluid pressure, means responsive to the fluid pressure remaining after said leakage, and means settable in accordance with a function of the slant range for opposing the movements of said responsive means.

4. A sound lag error computing means including a sound locator, means for developing positive and negative fluid pressures according to the direction of movement of the sound locator, means whereby said first means is actuated in accordance with the movements of said sound locator, means permitting leakage of said fluid pressure, the rate of leakage varying with the pressure, means responsive to the fluid pressure remaining after said leakage, and means settable in accordance with a function of the slant range for opposing the movements of said responsive means to increase the pressure on said fluid with corresponding increase of leakage.

5. A sound lag computing means including a sound locator, a member settable in accordance with the angle of elevation of said sound locator, a second member settable in accordance with the distance of the object, means for developing positive and negative pressures according to the velocity and direction of movement of said first member, means movable in accordance with the pressure developed, opposing means for said movable means, and means whereby said second member varies the force of said opposing means in accordance with the range.

6. A sound lag computing means including a sound locator, a member settable in accordance with the angle of elevation of said sound locator, means for developing positive and negative fluid pressure according to the velocity and direction of movement of said member, means whereby said pressure developing means is actuated by said member, means movable in accordance with the pressure developed, opposing means for said movable means, and means for varying the application of said opposing means.

7. In a device for measuring distance traversed by an object, a member adapted to be maintained pointed at said object, whereby it is movable in accordance with the rate of movement of said object, means for developing positive and negative fluid pressure according to the velocity and direction of operation, means whereby said pressure developing means is actuated by said member, means movable in accordance with the pressure developed, opposing means for said movable means, and means for varying the application of said opposing means, said last-named means including a member operable in accordance with the range of said object.

8. In a device for measuring distance traversed by an aircraft, a member adapted to be maintained pointed at the aircraft, whereby it is movable in accordance with the rate of movement of said aircraft, means for developing positive and negative fluid pressure according to the velocity and direction of operation, means whereby said pressure developing means is actuated by said member, means movable in accordance with the pressure developed, opposing means for said movable means, and means for varying the application of said opposing means, said last-named means including a member operable as a function of the estimated altitude of the aircraft and angle of elevation of said member.

9. In a sound locator, means for computing the angular correction for sound lag comprising means for computing the slant range, means for generating the angular rate of movement of the sound locator, and means of combining a function of said range and generated rate to give the angular correction.

10. A sound lag error computing means including a sound locator, means for developing positive and negative fluid pressures according to the direction and rate of movement of the sound locator, means whereby said first means is actuated in accordance with the movement of said sound locator, and means responsive to the pressure developed, said last-named means including an expansible means and yielding means for opposing the movements of said expansible means in accordance with the range.

11. In a sound locator, means for computing the angular correction for sound lag comprising means for computing the slant range from elevation angle and altitude, means for generating one component of the angular rate of movement of the sound locator, and means of combining a function of said range and rate to give the angular correction in one plane.

12. In a device for measuring the angular rate of movement of an object, such as a sight or sound locator, a pump driven by said object for developing positive and negative fluid pressure according to the direction and velocity of angular movement of said object, and means positioned in accordance with the magnitude and sign of the pressure developed, the position of which represents the angular rate and direction of movement of said object.

13. In a device for measuring the angular rate of movement of an object, such as a sight or sound locator, a pump driven by said object for developing positive and negative fluid pressure according to the direction and velocity of angular movement of said object, a fluid reservoir of relatively large capacity and a constant small leakage connected to said pump for averaging the developed pressure in accordance with the velocity and direction of rotation of the pump, and means positioned in accordance with the magnitude and sign of the pressure developed, the position of which represents the angular rate of movement of said object.

FRANK R. HOUSE.